(12) United States Patent
K S et al.

(10) Patent No.: US 12,289,182 B1
(45) Date of Patent: Apr. 29, 2025

(54) PROACTIVE TUNNEL CONFIGURATION COMPUTATION FOR ON-DEMAND SD-WAN TUNNELS

(71) Applicant: Juniper Networks, Inc., Sunnyvale, CA (US)

(72) Inventors: Nithyananda Vishnu K S, Tamil Nadu (IN); Venkata Rajasekharu Athreyapurapu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/148,387

(22) Filed: Dec. 29, 2022

Related U.S. Application Data

(63) Continuation of application No. 16/548,658, filed on Aug. 22, 2019, now Pat. No. 11,563,601.

(51) Int. Cl.
| | |
|---|---|
| *H04L 12/46* | (2006.01) |
| *H04L 41/0816* | (2022.01) |
| *H04L 43/0882* | (2022.01) |
| *H04L 47/20* | (2022.01) |

(52) U.S. Cl.
CPC ...... *H04L 12/4633* (2013.01); *H04L 41/0816* (2013.01); *H04L 43/0882* (2013.01); *H04L 47/20* (2013.01)

(58) Field of Classification Search
CPC .................................................. H04L 12/4633
See application file for complete search history.

(56) References Cited

U.S. PATENT DOCUMENTS

| | | |
|---|---|---|
| 8,442,052 B1 | 5/2013 | Hughes |
| 9,577,943 B1 | 2/2017 | Bhandarkar |
| 10,637,721 B2 | 4/2020 | Hughes et al. |

(Continued)

FOREIGN PATENT DOCUMENTS

| | | |
|---|---|---|
| CN | 108306831 A | 7/2018 |
| EP | 3435599 A1 | 1/2019 |

OTHER PUBLICATIONS

"Connect the Enterprise and Multicloud With Secure SD-WAN" Juniper Networks, Inc., Nov. 2018, available at https://www.juniper.net/assets/us/en/local/pdf/solutionbriefs/3510624-en.pdf, last accessed Mar. 29, 2019, 6 pp.

(Continued)

*Primary Examiner* — Guang W Li
(74) *Attorney, Agent, or Firm* — Shumaker & Sieffert, P.A.

(57) ABSTRACT

This disclosure describes techniques are described for proactively computing configuration information for policy-driven on-demand tunnel creation and deletion between sites in a software-defined networking in wide area network (SD-WAN) environment. In some examples, a controller device is configured to precompute configuration data for an overlay tunnel through the wide area network to connect a first site and a second site of a plurality of sites in the SD-WAN environment. The controller device is further configured to obtain, after precomputing the configuration data, an indication to configure the overlay tunnel. The controller device is also configured to send, in response to receiving the indication to configure the overlay tunnel, at least some of the configuration data to the first site to configure the first site with the overlay tunnel.

20 Claims, 7 Drawing Sheets

(56) References Cited

U.S. PATENT DOCUMENTS

| | | | |
|---|---|---|---|
| 11,129,023 B2* | 9/2021 | Olofsson | H04L 63/0272 |
| 11,252,084 B1* | 2/2022 | Cai | H04L 45/70 |
| 11,336,482 B2* | 5/2022 | Ramamoorthi | H04L 12/2859 |
| 11,362,951 B2 | 6/2022 | Zhao | |
| 11,398,961 B2* | 7/2022 | Victor | G06F 11/3006 |
| 11,563,601 B1 | 1/2023 | K S et al. | |
| 2014/0362686 A1 | 12/2014 | Jogalekar et al. | |
| 2015/0109967 A1 | 4/2015 | Hogan et al. | |
| 2015/0124622 A1 | 5/2015 | Kovvali et al. | |
| 2016/0072669 A1 | 3/2016 | Saavedra | |
| 2016/0080251 A1 | 3/2016 | Ramachandran et al. | |
| 2016/0087878 A1* | 3/2016 | Sella | H04L 45/243 370/392 |
| 2016/0205029 A1* | 7/2016 | Sugunadass | H04L 41/0896 370/236 |
| 2016/0255542 A1 | 9/2016 | Hughes et al. | |
| 2016/0315808 A1* | 10/2016 | Saavedra | H04L 49/70 |
| 2016/0380823 A1 | 12/2016 | Shen et al. | |
| 2017/0026417 A1 | 1/2017 | Ermagan et al. | |
| 2017/0099188 A1 | 4/2017 | Chang et al. | |
| 2017/0207976 A1 | 7/2017 | Rovner et al. | |
| 2018/0013584 A1 | 1/2018 | Shen et al. | |
| 2018/0181423 A1 | 6/2018 | Gunda et al. | |
| 2018/0270118 A1 | 9/2018 | Lee et al. | |
| 2018/0295180 A1 | 10/2018 | Yang et al. | |
| 2018/0343146 A1* | 11/2018 | Dunbar | H04L 45/50 |
| 2019/0036909 A1* | 1/2019 | Goeringer | G06F 21/606 |
| 2019/0158605 A1* | 5/2019 | Markuze | H04L 69/163 |
| 2019/0182213 A1 | 6/2019 | Saavedra et al. | |
| 2019/0190819 A1 | 6/2019 | Choudhury et al. | |
| 2019/0207844 A1 | 7/2019 | Kodavanty et al. | |
| 2019/0268421 A1 | 8/2019 | Markuze et al. | |
| 2019/0268973 A1* | 8/2019 | Bull | H04W 92/02 |
| 2019/0274070 A1 | 9/2019 | Hughes et al. | |
| 2019/0288875 A1* | 9/2019 | Shen | H04L 12/5691 |
| 2020/0067831 A1* | 2/2020 | Spraggins | H04L 41/0895 |
| 2020/0092209 A1 | 3/2020 | Chen | |
| 2020/0162371 A1 | 5/2020 | Musku et al. | |
| 2020/0342346 A1* | 10/2020 | Wulff | H04L 41/40 |
| 2020/0382414 A1* | 12/2020 | Vasseur | H04L 47/127 |
| 2020/0389796 A1 | 12/2020 | Olofsson et al. | |
| 2020/0413283 A1* | 12/2020 | Shen | H04L 45/64 |
| 2021/0036987 A1* | 2/2021 | Mishra | H04L 61/2592 |
| 2021/0076257 A1* | 3/2021 | Pocha | H04W 76/15 |
| 2021/0136871 A1* | 5/2021 | Bull | H04W 92/02 |
| 2021/0152450 A1 | 5/2021 | Iyer et al. | |
| 2021/0409275 A1* | 12/2021 | Galchenko | H04L 63/20 |
| 2022/0103466 A1* | 3/2022 | Cai | H04L 45/123 |
| 2022/0103470 A1 | 3/2022 | Kulkarni et al. | |
| 2022/0360502 A1* | 11/2022 | Vasseur | H04L 41/0896 |

OTHER PUBLICATIONS

"Contrail SD-WAN and SD-LAN—Design and Architecture Guide", Juniper Networks, Inc., Retrieved from https://www.juniper.net/documentation/en_US/release-independent/solutions/information-products/pathway-pages/sg-007-sd-wan-sd-lan-design-arch-guide.html, Aug. 8, 2019, 126 pp.

"Contrail SD-WAN Design & Architecture Guide", Juniper Networks, Inc., 2018, available at https://www.juniper.net/documentation/en_US/release-independent/solutions/information-products/pathway-pages/sg-007-contrail-sd-wan-design-architecture.pdf, last accessed Mar. 27, 2019, 46 pp.

"EANTC Independent Test Report," Juniper Contrail SD-WAN Solution, Sep. 2018, 14 pp.

"SLA Profiles and SD-WAN Policies Overview," Juniper Networks, Aug. 21, 2018, 6 pp.

Prosecution History from U.S. Appl. No. 16/548,658, now issued U.S. Pat. No. 11,563,601, dated Sep. 30, 2021 through Dec. 16, 2022, 84 pp.

Sathyanarayan et al., "Auto Discovery VPN Protocol", draft-sathyanarayan-ipsecmeadvpn-03, available at https://datatracker.ietf.org/meeting/88/materials/slides-88-ipsecme-3 (last accessed Mar. 7, 2019), Nov. 4, 2013, 17 pp.

* cited by examiner

US 12,289,182 B1

PROACTIVE TUNNEL CONFIGURATION COMPUTATION FOR ON-DEMAND SD-WAN TUNNELS

This application is a continuation of U.S. patent application Ser. No. 16/548,658, filed 22 Aug. 2019, the entire contents of which is incorporated herein by reference.

TECHNICAL FIELD

The disclosure relates to computer networks, and more particularly, to software-defined networking in a wide area network (SD-WAN) tunnels.

BACKGROUND

A computer network includes a number of devices, such as computers, that are interconnected by network infrastructure. In some cases, these devices are grouped into a number of sites implemented as local area networks (LAN), which in turn may be geographically distributed over a wide area and interconnected by a wide area network (WAN).

Typical sites, such as branch offices, data centers, campus/corporate offices, service networks, and other networks that communicate over a WAN, can have multiple WAN connection types, including Multiprotocol Label Switching (MPLS), Internet, and so on. In these traditional networks, the MPLS-based connection typically includes performance guarantees, or service level agreements (SLAs) to ensure business-critical applications can function properly; the Internet connection provides an alternative link for backup and load balancing purposes. However, with Internet access offerings providing ever-increasing bandwidth, many applications can now reasonably be routed over the Internet link.

Software-defined networking in a WAN (SD-WAN) is a connectivity solution implemented as an overlay on top of traditional WAN access. An SD-WAN solution provides the ability to make use of MPLS, Internet, and other WAN connection links. To interconnect sites and in some cases to provide secure site-to-site connectivity, SD-WAN typically involves virtual overlay networks based on overlay tunnels (sometimes referred to as SD-WAN tunnels) that transport traffic over the WAN.

In a hub-and-spoke topology, a hub operates to facilitate communication between spoke sites. Some configurations of the hub-and-spoke topology pass all data through a hub, isolating the spoke sites, and allowing communication between devices within different spoke sites only through the hub. In a full mesh topology, each site is directly connected to every other site via respective tunnels. A dynamic mesh topology is similar to a full mesh topology where every site is capable of connecting directly to any other site. But with dynamic mesh, the tunnels are brought up on-demand, thereby reducing the continual load on any one site. A single tenant can support both hub-and-spoke and dynamic mesh topologies.

SUMMARY

In general, techniques are described for proactively computing configuration information for policy-driven on-demand tunnel creation and deletion between sites in a software-defined networking in wide area network (SD-WAN) environment. In an SD-WAN environment employing a dynamic mesh topology, an SDN controller configures tunnels between sites to enable communication directly between sites (e.g., not via a hub). Tunnel configuration for a tunnel between two sites involves execution of various protocols (e.g., Internet Key Exchange (IKE) protocol for Internet Protocol Security (IPsec) devices, GRE, MPLS, routing, and so forth) to compute configuration data for the tunnel. As described herein, a software-defined network (SDN) controller may proactively execute such protocols and otherwise compute the configuration data to be pushed to the site devices for establishing the tunnel over the WAN. The SDN controller may proactively compute such tunnel configuration data for each potential site-to-site tunnel in a potential full mesh of sites for an SD-WAN environment, even though not every site-to-site traffic profile satisfies the policy that would trigger creating a direct connection at the time the SDN controller computes the configuration data for the tunnels. Upon the addition of new site to the SD-WAN environment, the SDN controller may compute new tunnel configuration data for the new site to all other sites, or to select sites within the SD-WAN environment.

The SDN controller subsequently obtains an indication to configure a site-to-site tunnel in the SD-WAN environment. The indication may be based, for example, on determining that one or more key performance indicators (KPIs) are met, such as a threshold for traffic, a number of sessions, or a traffic profile between the sites. In response to the indication, the SDN controller sends the already-computed configuration data to the sites to configure them with the tunnel, thereby configuring the tunnel between the sites on an on-demand basis. However, rather than calculating the configuration data for a site-to-site tunnel after policies for the dynamic mesh indicate to create the tunnel, the SDN controller proactively computes the tunnel configuration data for all full mesh-capable sites. In this way, once the SDN controller determines that a tunnel is to be created based on the performance indicators, the SDN controller can efficiently push the configuration details to the requisite node devices rather than spend valuable time computing the configuration data after the need for an on-demand has already been met.

The techniques may provide one or more technical advantages having at least one practical application. For example, SDN controllers may expend on the order of minutes computing configuration parameters between a single pair of sites. In many instances, by the time the SDN controller finishes the computing configuration data for a tunnel, the need for the tunnel may no longer exist. Additionally, if the need for multiple tunnels arises nearly simultaneously, calculating the parameters for each of those tunnels only compounds the issue with waiting until the policies for creating these tunnels are met, as configuration data for the tunnels are computed one after another. Further, when a tunnel for a pair of sites is created and subsequently deleted, the SDN controller ordinarily recomputes the configuration data if another tunnel between the same pair of sites is to be again configured. By proactively, rather than reactively in response to an on-demand indication, computing configuration data for many such, and in some cases all, tunnels that could be created between sites, the SDN controller decreases the time requires to configure a tunnel once the on-demand policies indicate that the tunnel should be established. This increases the number of tunnels the SDN controller can configure per unit of time. Further, the SDN controller may compute the configuration data for tunnel during idle time or during computationally low-stress periods, using resources more effectively and efficiently than systems that require configuration calculation during an already computationally high-stress period.

In one example of this disclosure, a method includes precomputing, by a controller for performing software-defined networking in a wide area network (SD-WAN) environment comprising a wide area network, configuration data for an overlay tunnel through the wide area network to connect a first site and a second site of a plurality of sites in the SD-WAN environment. The method further includes obtaining, by the controller, after precomputing the configuration data, an indication to configure the overlay tunnel. The method also includes sending, by the controller, in response to receiving the indication to configure the overlay tunnel, at least some of the configuration data to the first site to configure the first site with the overlay tunnel.

In another example of this disclosure, a controller device for performing software-defined networking in a wide area network (SD-WAN) environment comprising a wide area network. The controller device comprises a memory; and one or more processors in communication with the memory, the one or more processors and memory configured to: precompute configuration data for an overlay tunnel through the wide area network to connect a first site and a second site of a plurality of sites in the SD-WAN environment; obtain, after precomputing the configuration data, an indication to configure the overlay tunnel; and send, in response to receiving the indication to configure the overlay tunnel, at least some of the configuration data to the first site to configure the first site with the overlay tunnel.

In another example of this disclosure, a non-transitory computer-readable storage medium stores instructions thereon that when executed cause one or more processors, via execution of a controller for performing software-defined networking in a wide area network (SD-WAN) environment comprising a wide area network, to precompute configuration data for an overlay tunnel through the wide area network to connect a first site and a second site of a plurality of sites in the SD-WAN environment. The instructions further cause the one or more processors to obtain, after precomputing the configuration data, an indication to configure the overlay tunnel. The instructions also cause the one or more processors to send, in response to receiving the indication to configure the overlay tunnel, at least some of the configuration data to the first site to configure the first site with the overlay tunnel.

The details of one or more embodiments of the techniques are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and text.

DETAILED DESCRIPTION

Figure 1:
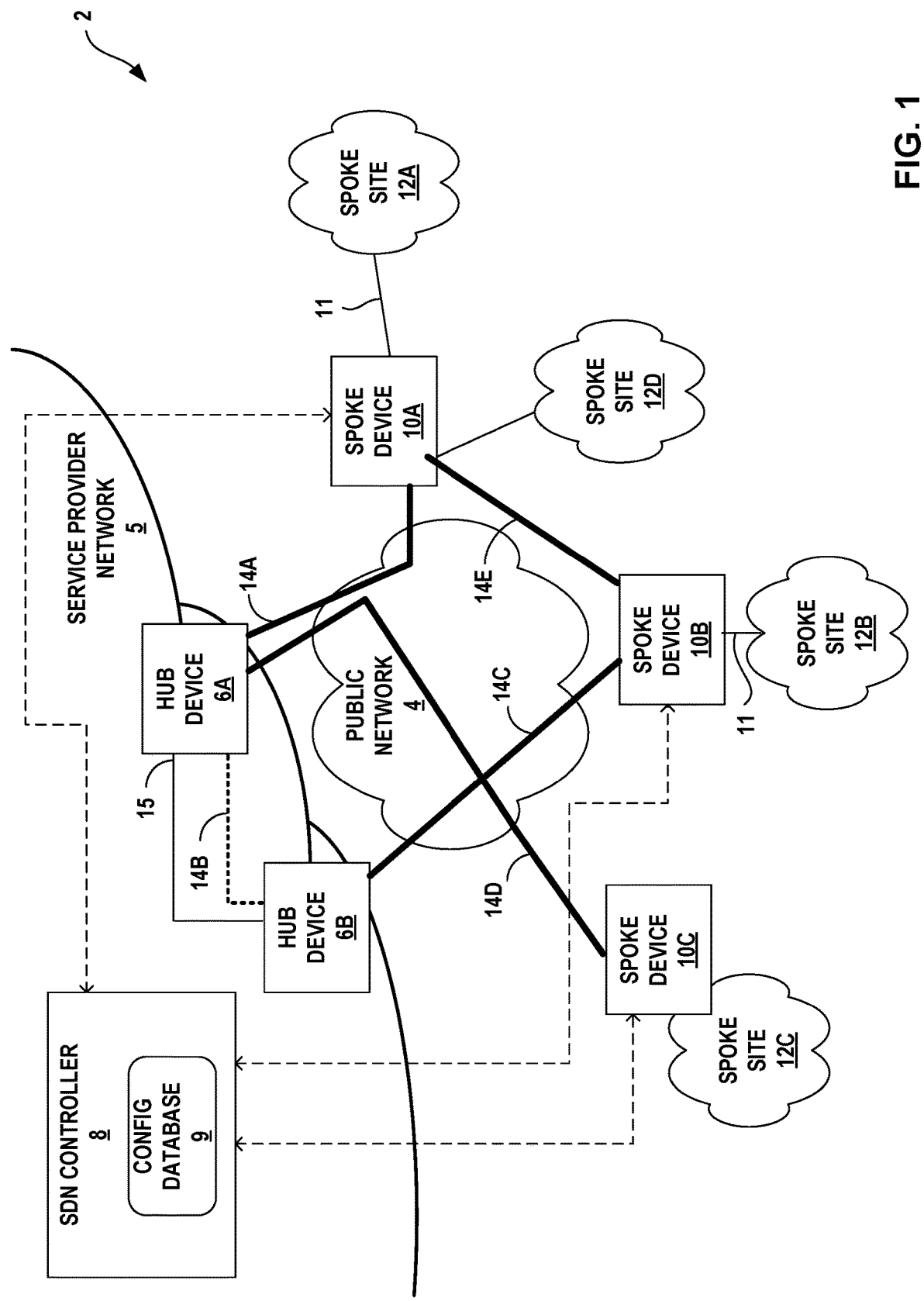
FIG. 1 is a block diagram illustrating an example network configured in a hub-and-spokes topology, in accordance with techniques of this disclosure.

FIG. 1 is a block diagram illustrating an example network in which sites of a software-defined networking in a wide area network (SD-WAN) environment are configured in a hub-and-spoke topology, in accordance with techniques of this disclosure. As described herein, network 2 is configured to operate as a dynamic mesh topology in which tunnels are dynamically created and deleted between spoke sites in a centrally managed, policy-driven manner.

Network 2 includes spoke sites 12A-12D ("spoke sites 12") connected to a public network 4. Spoke sites 12 may be geographically-distributed sites of an enterprise (e.g., branch offices or data centers), sites of different enterprises, service provider (e.g., XaaS) sites, other types of sites, or a combination thereof. Network 2 may include more or fewer spoke sites 12.

As illustrated, network 2 includes service provider network 5. Service provider network 5 operates to provide packet-based network services to spoke sites 12. Some or all of spoke sites 12 may be connected to service provider network 5. Service provider network 5 may provide services to one or more customers (e.g., hub connectivity and/or spoke connectivity over private network), such as customers at spoke sites 12. As illustrated, service provider network 5 includes software-defined networking (SDN) controller 8 and hub devices 6. However, service provider network 5 including SDN controller 8 is one non-limiting example. In some examples, SDN controller 8 may be a distributed controller that executes at least in part at spoke sites 12 (e.g., may have agents executing at spoke set networks 12) or within customer data centers (public or private) as a few examples. SDN controller 8 may represent a SD-WAN controller that configures hub devices 6 and spoke devices 10 to form one or more overlay tunnels through service provider network 5 and/or public network 4 to enable communications between pairs of sites using overlay tunnel between the pairs of sites.

In the example illustrated in FIG. 1, tunnels 14, described in more detail below, are configured to transport communications between spoke devices 10 associated with spoke sites 12, hub devices 6, or otherwise transport communications as overlay between sites in an SD-WAN environment. As illustrated, tunnels 14 are shown as traversing public network 4. In some examples, tunnels 14 may traverse through service provider network 5 and not public network 4. Also, although hub devices 6 are illustrated as being part of service provider network 5, the example techniques are not so limited. In some examples, hub devices 6 may reside elsewhere and use public network 4 and/or service provider network 5 to communicate with spoke devices 10 through respective tunnels 14. As one example, one or more of hub devices 6 may reside at customer premises. In such example, hub devices 6 residing at customer premises may be considered as being tenant site hub devices because hub devices 6 are hub devices for the tenant. Each of tunnels 14 may include MPLS, Internet, and other WAN connection links. Each of tunnels 14 may be an MPLS over GRE (MPLSoGRE), MPLS over MPLS (MPLSoMPLS), MPLS over User Datagram Protocol (MPLSoUDP), IPSec, or other type of overlay tunnel.

The example techniques described in this disclosure may be applicable to the various ways in which network 2 is configured. For instance, the techniques described herein may be implemented by SDN controllers for hub-and-spoke networks, as shown in network 2. In other instances, the techniques described herein may be implemented on other configurations of network 2, such as dynamic mesh arrangements or some other mesh network.

An enterprise may be a tenant within one or more customer data centers, and SDN controller 8 may execute within these one or more customer data centers. As another example, an enterprise, rather than having its own customer data center (e.g., private cloud) may utilize a public data center (e.g., public cloud). SDN controller 8 may execute in the public cloud. Accordingly, SDN controller 8 may execute in a data center of service provider network 5, in a private cloud, a public cloud, any of sites 6 or 12, and/or other location. SDN controller 8 may be a distributed controller having multiple distributed applications executing on multiple computing devices, such as real and/or virtual servers.

Service provider network 5 also includes a software-defined networking (SDN) controller 8. SDN controller 8 provides a logically, and in some cases, physically centralized controller for facilitating operations of service provider network 5 for implementing an SD-WAN environment. As one example, network 2 is an overlay tenant network. For instance, SDN controller 8 may be configured to configure tunnels between spoke sites 12 (e.g., via respective spoke devices 10 and hub devices 6, as described in more detail). In this way, SDN controller 8 facilitates communication through SD-WAN (e.g., network 2). As described in more detail below, SDN controller 8 may determine in a policy-driven manner whether to dynamically configure tunnels between spoke devices 10 to bypass routing traffic through one or more hub devices 6. SDN controller 8 may also be configured to proactively calculate configuration parameters for tunnels that may be created between spoke devices 10 in a policy-driven manner, which would cause traffic between spoke devices 10 to be routed directly between spoke devices 10.

Public network 4 may include one or more autonomous systems (not shown) and may represent the Internet. Public network 4 may include a number of devices (not shown), such as routers and switches, used to route packets from point to point across public network 4. Public network 4 may include one or more MPLS/IP networks.

Each of spoke sites 12 may include one or more devices (not shown), such as personal computers, laptop computers, handheld computers, workstations, servers, routers, switches, printers, fax machines, or the like. Each of spoke sites 12 may include one or more Local Area Networks (LANs) (not shown).

As shown in FIG. 1, spoke sites 12 may be connected to public network 4 via spoke devices 10A-10C ("spoke devices 10"). Spoke devices 10 may be located at respective spoke sites 12 but are shown separately to ease with illustration. As used herein, tunnels configured for a site are tunnels configured in a spoke device for the site to enable tunneled communications between the site and another site or hub. Spoke devices for a spoke site (or more generally, edge devices for a site) are endpoints of the overlay tunnels for connecting sites across the WAN in an SD-WAN environment. As such, references herein to tunnels between pairs of sites refer more specifically to tunnels between respective edge devices (e.g., gateways, edge routers, or security devices) for the sites, such as spoke device 10 for respective spoke devices 12. Similarly, references herein to a tunnel between a pair of edge devices for respective sites refer also to a tunnel between the sites themselves. In some examples, spoke devices 10 may be off-premises relative to spoke sites 12. Spoke sites 12 may be considered to be edge networks of public network 4. Examples of spoke devices 10 and hub devices 6 may include security devices, edge devices such as customer edge routers, gateways, or other network device capable of implementing tunnels.

Any of spoke sites 12 may be an infrastructure as a service (IaaS) or a platform as a service (PaaS) executing in a public cloud. In this example, spoke device 10C may be a virtualized network function executing on a server to functions as an endpoint and ensures that secure access is established with the applications executing in the public cloud (e.g., cloud-native applications). In some examples, an endpoint may not be required for the public cloud such as in spoke site 12D, where spoke site 12D provides a software as a service (SaaS). As illustrated, spoke site 12D is coupled to spoke device 10A for access to service provider 5.

Hub devices may be edge routers within service provider network 5. Hub devices 6 may include WAN hubs, or secure WAN hubs. Each of hub devices 6A and 6B may be a gateway, such as an SD-WAN gateway.

Hub devices 6A and 6B and spoke devices 10A-10C may be administered by the entity, e.g., the service provider of service provider network 5, that provides network services to the enterprise that includes spoke sites 12. Spoke devices 10 may be coupled to customer premises equipment (CPE) and in some examples may be the CPE, as spoke devices 10 may reside at customer's premises.

Each of spoke sites 12 may, as shown in FIG. 1, connect to public network 4 via one of spoke devices 10, or may be connected to public network 4 via multiple spoke devices 10. For simplicity, FIG. 1 shows only spoke sites 12 connected to public network 4 via spoke devices 10 but the techniques are not so limited.

Each of spoke sites 12 may be connected to spoke devices 10A-10C, via one or more access links 11. Furthermore, hub devices 6 may connect to gateway devices of service provider network 5 via one or more physical or logical interfaces (not shown) of hub devices 6 and spoke devices 10 may connect to gateway devices and to public network 4 via one or more physical or logical interfaces (not shown) of spoke devices 10. Network interface cards of hub devices 6 and spoke devices 10 may provide the physical or logical interfaces. Each access link 11 may correspond to a physical or logical interface of devices 6 and 10.

In certain deployment scenarios, it is desirable to deploy a software-defined wide area network (SD-WAN) solution in a dynamic mesh topology. In a dynamic mesh topology, spoke sites 12 connect to each other via direct overlay tunnels thereby conserving the network bandwidth in the underlay network. For example, in a dynamic mesh topology, any of spoke devices 10 would have a tunnel to other spoke devices 10 without needing to go through respective hub devices 6. Overlay tunnel could be IPSec, GRE, MPLS over GRE, IPSec over MPLS over GRE, MPLS over MPLS, or any other form where the underlay network is not aware of the payload that it is carrying and as a result the internal header forwarding requirements.

SDN controller 8 may be a software-defined networking (SDN) controller executing on programmable hardware (e.g., programmable processing circuitry) including a general purpose computer. However, SDN controller 8 may be a hardware component (e.g., fixed-function processing circuitry), or a combination of software and hardware (e.g., combination of programmable and fixed-function processing circuitry).

SDN controller 8 may execute in a cloud-environment setup by service provider network 5. In the cloud-environment, one or more servers execute SDN controller 8. The one or more servers may be located in a data center, and the data center may include a router (e.g., gateway router) that provides connection to public network 4. In some examples, the one or more servers that execute SDN controller 8 may be located in the same location as one or more of spoke sites 12. For example, SDN controller 8 may execute on customer premises. SDN controller 8 may be a distributed controller and therefore portions of SDN controller 8 may execute at various different locations within network 2 (e.g., the SD-WAN). In this disclosure, when SDN controller 8 is described as performing the example operations, it should be understood that the programmable hardware (e.g., general purpose computer processor or specialized processing circuit) on which SDN controller 8 executes is performing the example operations in examples where SDN controller 8 is software executing on programmable hardware. As described above, SDN controller 8 is configured to form tunnels (e.g., paths) on-demand rather than having a static configuration of tunnels that form a full-mesh.

SDN controller 8 includes configuration database 9 (illustrated as "config database 9"). Configuration database 9 may represent a data store for storing configuration data for tunnels between pairs of sites 12. In accordance with the techniques described herein, SDN controller 8 precomputes configuration data for overlay tunnel 14E to connect a first site 12A and a second site 12B in the SD-WAN environment. That is, SDN controller 8 computes the configuration data prior to any direction or indication to configure overlay tunnel 14E to connect sites 12A and 12B. SDN controller 8, in some examples, stores this configuration data in configuration database 9. SDN controller 8 obtains, after precomputing the configuration data, an indication to configure the overlay tunnel between sites 12A and 12B. In response to receiving the indication to configure the overlay tunnel, SDN controller 8 sends at least some of the configuration data to spoke device 10A to configure spoke device 10A with overlay tunnel 14E. In this way, when SDN controller 8 obtains an indication that the current traffic being routed between the pair of spoke devices 10 satisfies the policies instituted in network 2 for configuring tunnel 14E, SDN controller 8 may read the configuration data for each side of the tunnel 14E from configuration database 9 and push the configurations to each of the spoke devices 10 that form the endpoints for the tunnel 14E, rather than compute the parameters for the configuration after the policies have been met.

Figure 2:
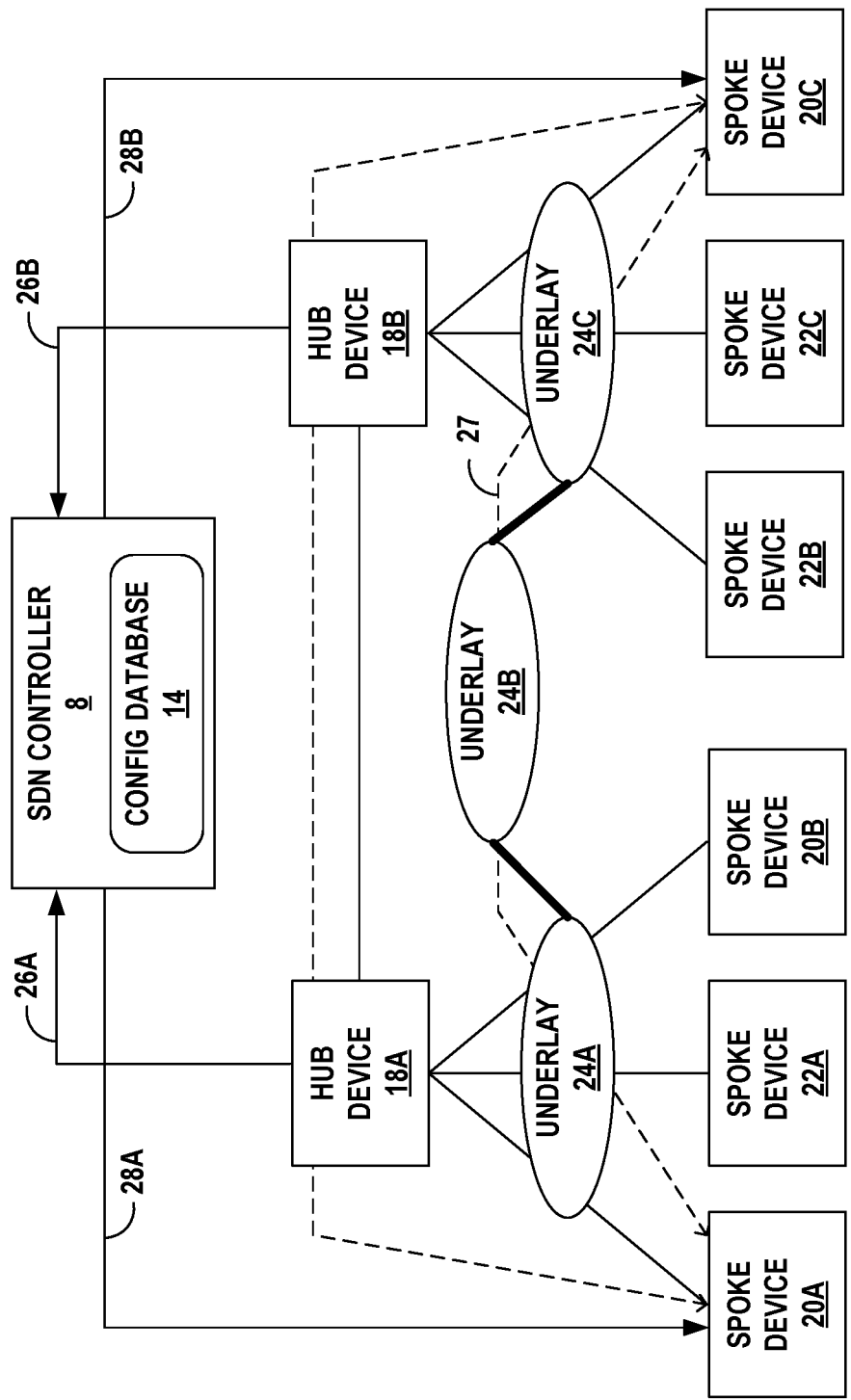
FIG. 2 is a block diagram illustrating another example network configured in a hub-and-spokes topology, in accordance with techniques of this disclosure.

FIG. 2 is a block diagram illustrating another example network configured in a hub-and-spokes topology, in accordance with techniques of this disclosure. For example, FIG. 2 depicts a flow of events in one example, non-limiting use case.

In FIG. 2, spoke devices 20A, 20B, and 20C are example spoke devices that form as a first mesh, and spoke devices 22A, 22B, and 22C are example spoke devices that form as a second mesh. As one example, spoke devices 20A, 20B, and 20C may be devices for a first enterprise, and spoke devices 22A, 22B, and 22C may be devices for a second, different enterprise. Based on policy criteria being satisfied, there may be possibility to form direct tunnels between devices 20 or between devices 22 but may be not between devices 20 and devices 22 since devices 20 and devices 22 are for different enterprises.

Spoke devices 20 and 22 may represent example instances of spoke devices 10. Initially, spoke device 20A may communicate with spoke device 20C via hub device 18A and hub device 18B. However, SDN controller 8 may receive measurements that indicate that a tunnel should be configured from spoke device 20A to spoke device 20C. In turn, SDN controller 8 may form a tunnel between spoke device 20A and spoke device 20C through underlay 24A, 24B, and 24C, as illustrated. Underlay 24A, 24B, and 24C may include network devices that underly the overlay tunnel that SDN controller 8 configures to bypass hub devices 18A and 18B.

Prior to the establishment of any tunnels between spoke devices 20A-20C and/or 22A-22C, SDN controller 8 may add each potential pair of spoke devices to a configuration computation queue. SDN controller 8 may cycle through this queue, precomputing tunnel configuration data for each pair of spoke devices in the queue and removing the pair from the queue after completing the configuration data computation. SDN controller 8 may calculate these tunnel configuration parameters using any reliable methodology, such as the IKE protocol for IPsec devices. SDN controller 8 may store these calculated parameters in configuration database 9 for utilization when the policy conditions for tunnel creation are met.

As illustrated, SDN controller 8 may collect information 26A and 26B from hub devices 18A and 18B that indicates an amount of traffic flowing between spoke devices 20A and 20C that communicate via one or more of the hubs 18. In some cases, SDN controller 8 obtains such traffic information from either or both of spoke devices 20A and 20C. Based on this information, SDN controller 8 determines whether conditions for creating a direct tunnel between spoke devices 20A and 20C are met. The thresholds may correspond to an amount of traffic, bandwidth consumed, traffic profile, number of sessions, or other condition. In some cases, SDN controller 8 receives a request from an administrator or other agent that requests to create the direct tunnel 27 to indicate to create the tunnel.

If so, SDN controller 8 creates a direct tunnel between device 20A and device 20C. SDN controller 8 sends configuration data 28A to device 20A and configuration data 28B to device 20C to configure tunnel 27 over underlay networks 24. SDN controller 9 may retrieve the previously computed configuration data for the tunnel 27 between devices 20A and 20C from configuration database 9.

Tunnel 27 and other tunnels described in this disclosure may be secure tunnels, such as IPSec tunnels. An IPSec tunnel consists of a pair of unidirectional security associations (SAs) to use in securing a communication channel. An IPSec tunnel can provide privacy using encryption, content integrity using data authentication, sender authentication, and nonrepudiation. An SA groups together the following components for securing communications: security algorithms and keys, protocol mode (transport or tunnel), key management method (manual or AutoKey IKE), and SA lifetime. Configuration data for an IPSec tunnel computed by SDN controller 8 may include key and other data usable for implementing each of the unidirectional SAs for the IPSec tunnel.

Figure 3A:
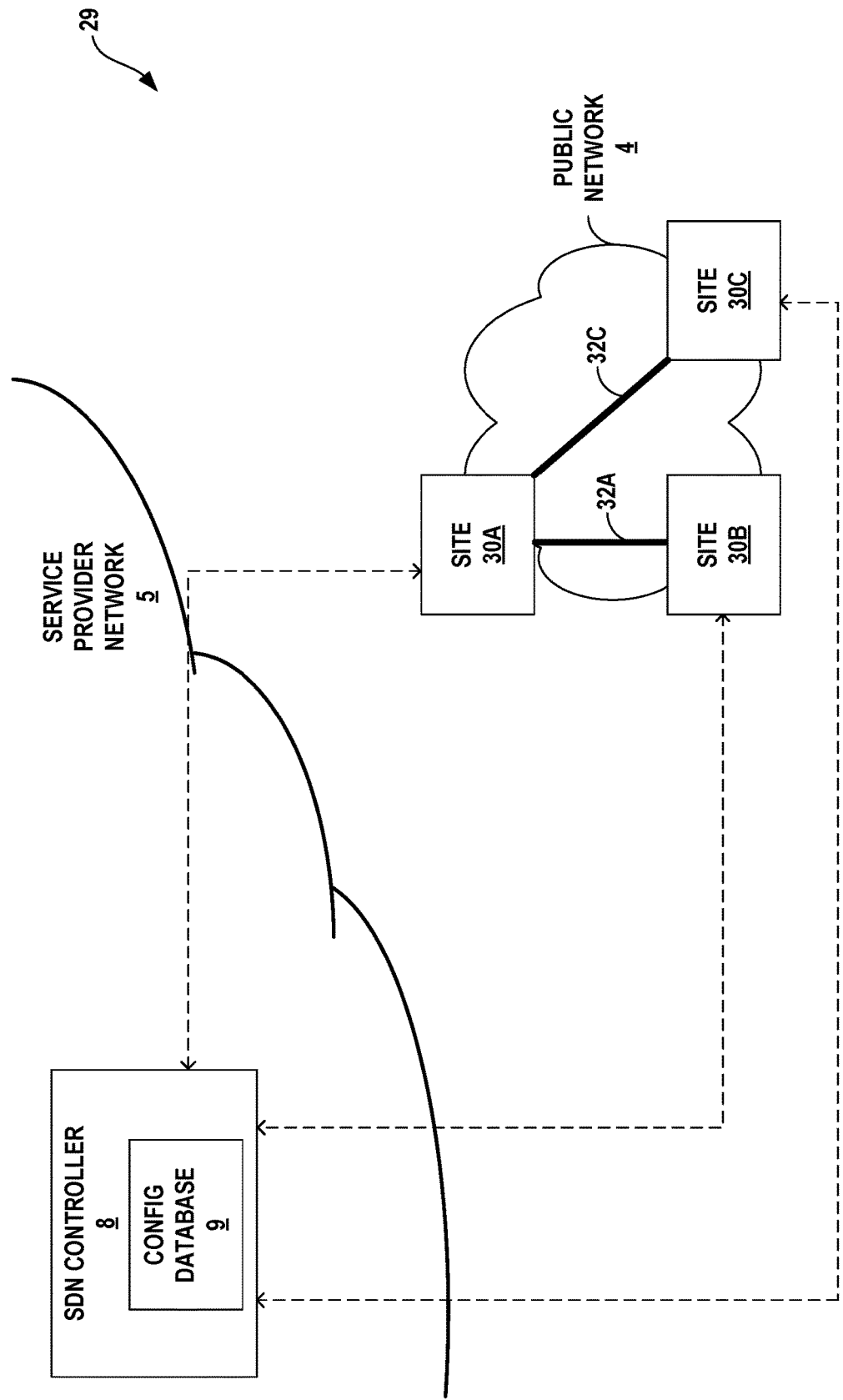
FIGS. 3A-3C are block diagrams illustrating another example network configured in a dynamic mesh topology, in accordance with techniques of this disclosure.
Figure 3B:
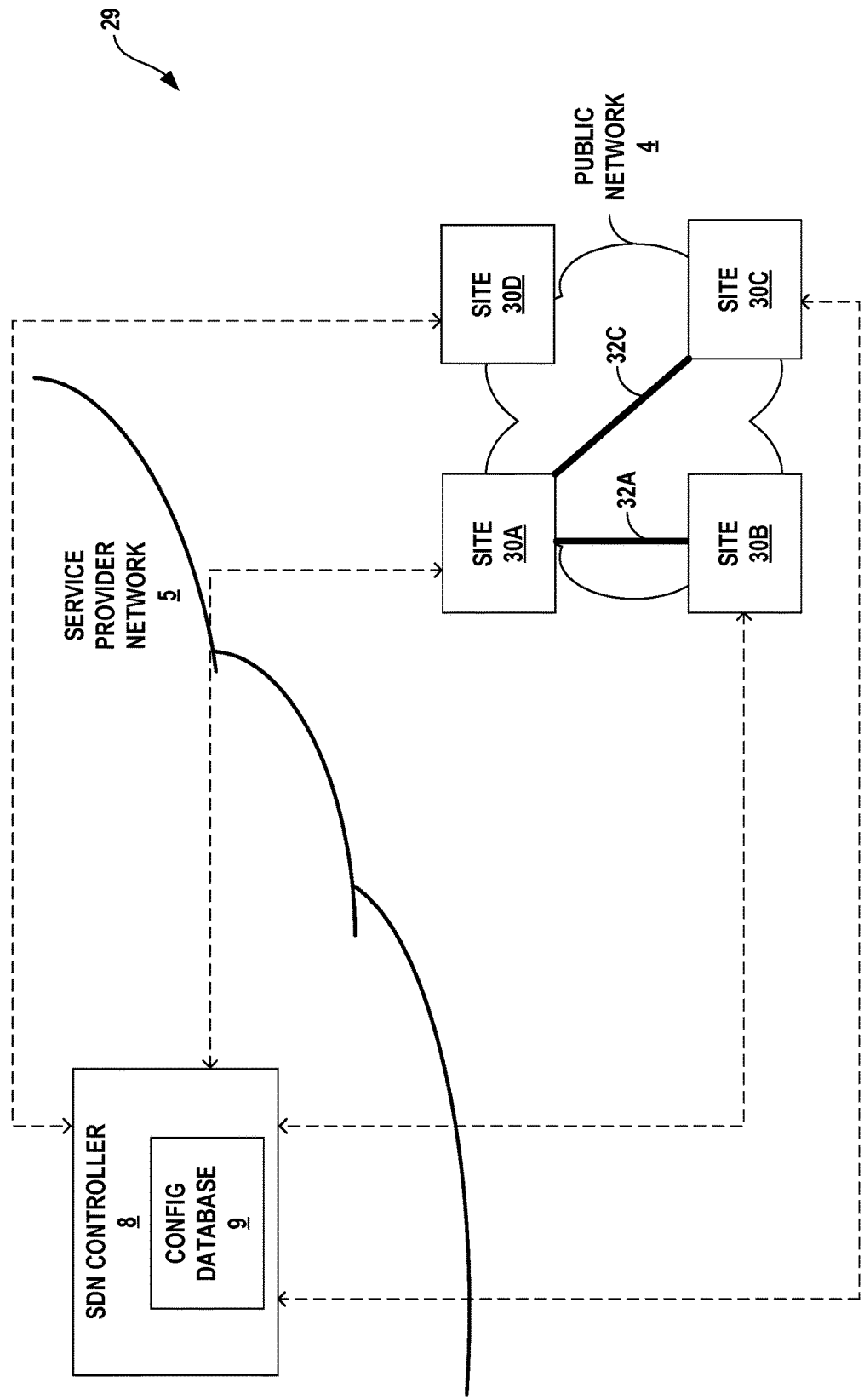
Figure 3C:
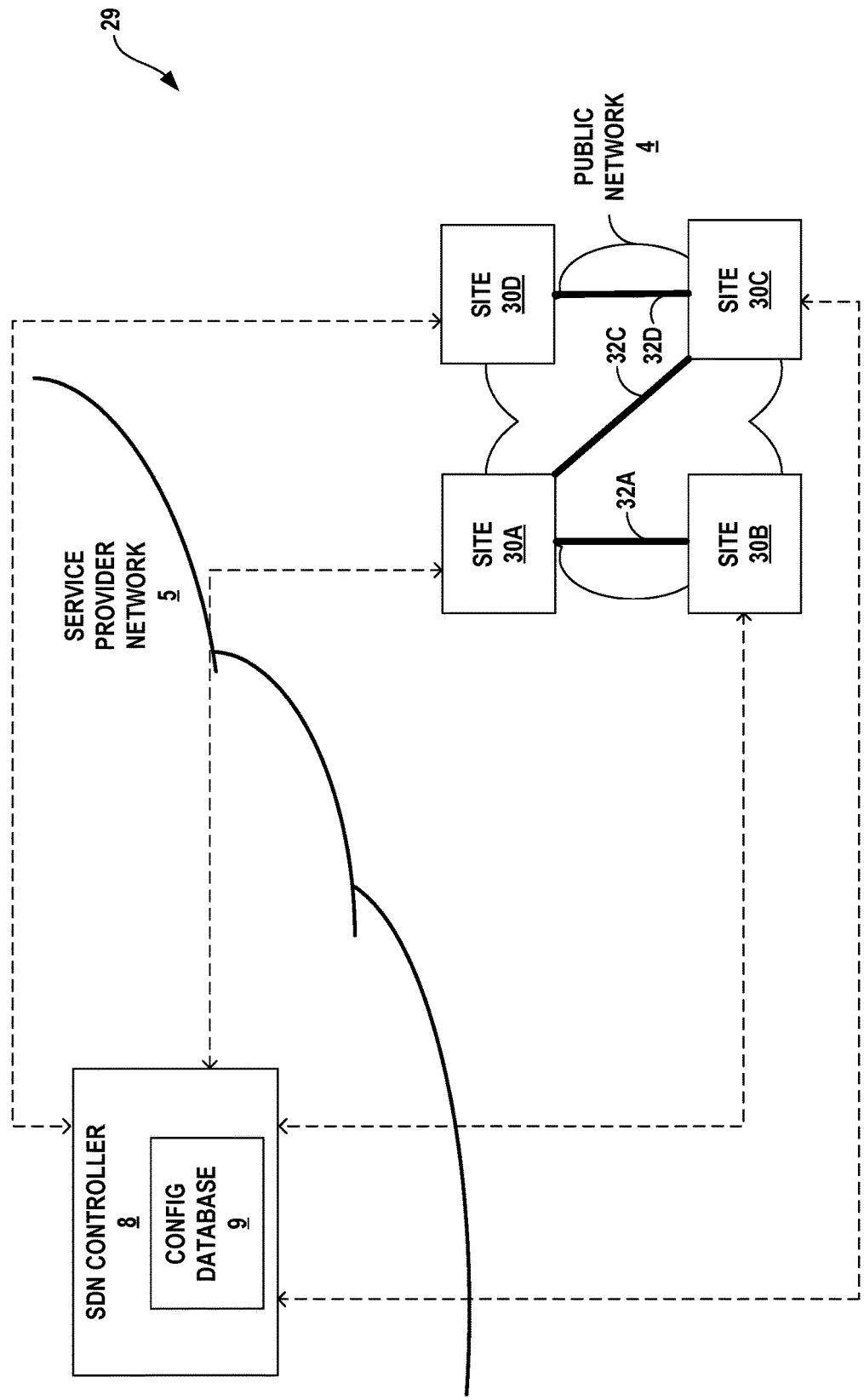

FIGS. 3A-3C are block diagrams illustrating another example network configured in a dynamic mesh topology, according to techniques described herein. In a full mesh topology, SDN controller 8 (e.g., central controller or cloud service orchestrator (CSO)) would configures the full mesh tunnels by configuring each site with overlay tunnels to all other sites. In such cases, the number of such tunnels created are O(N) on each site, and SDN controller 8 would have to create such tunnels for every end-point-thereby having a provisioning and monitoring computation of $O(N^2)$. Each site also has a redundant connection to all other sites by creating multiple tunnels, a factor of k-typically from 2 to 9. A dynamic full mesh provides for on-demand tunnels so that each site is not continually loaded with a full set of tunnels to each other site.

In FIG. 3A, sites 30A-30C are interconnected via links and network devices public network 4. That is, each of sites 30 can communicate with each other of sites 30 via public network. In some cases, sites 30A-30C may have alternatively, or additional, have connections via service provider network 5.

As sites 30A-30C are already established in public network 4, SDN controller 8 may have computed, or may be in the process of computing, configuration data for overlay tunnels between any pair of sites 30A-30C. SDN controller 8 stores this configuration data in configuration database 9. If, at any point in the future, SDN controller 8 determines that certain policies have been met where an overlay tunnel is required between any pair of site 30A-30C, SDN controller 8 may retrieve the configuration parameters corresponding to the pair of sites and push the configuration parameters directly to each site in the pair.

In FIG. 3B, site 30D to is added system 29 as a full mesh capable site. In response to this addition, which may include receiving site configuration data for site 30D, SDN controller 8 computes configuration data for tunnels between site 30D and each of sites 30A-30. To compute the configuration data, SDN controller 8 may add three tunnel compute requests to a queue for configuration parameter computation, the three tunnel compute requests corresponding to pairings of site 30D with each other of sites 30A-30C. SDN controller 8 may compute the configuration parameters for each pairing in the queue in response to the addition of site 30D to the SD-WAN environment including sites 30A-30D. As each tunnel compute request is completed, SDN controller 8 stores the computed configuration data for the corresponding tunnel in configuration database 9 and advances to the next tunnel compute request in the queue.

In the example of FIG. 3C, SDN controller 8 obtains an indication to configure a tunnel between site 30D and site 30C. For instance, SDN controller 8 may obtain the indication by receiving a tunnel configuration request requesting the tunnel. As another example, SDN controller 8 may monitor traffic between the sites by processing jFlow or other flow monitoring data and detecting that certain policies have been met to warrant establishing a tunnel between sites 30C and 30D. This could be due to sites 30C and 30D exchanging a particular class of data flow, a threshold number of sessions being exceeded, or a threshold amount of throughput (measured in bits per second) between the sites being exceeded, among other things. SDN controller 8 inspects configuration database 9 to determine if SDN controller 8 has already computed configuration parameters for an overlay tunnel 32D between sites 30C and 30D. In response to determining that configuration database 9 includes configuration data for a tunnel between sites 30C and 30D, SDN controller 8 retrieves the configuration data for this overlay tunnel 32D from configuration database 9 and pushes respective portions of the configuration data to sites 30C and 30D to configure overlay tunnel 32D. (Pushing configuration data to a site may include configuring a CPE for the site with the configuration data.) Conversely, if SDN controller 8 determines that configuration database 9 does not stores the configuration data for overlay tunnel 32D between sites 30C and 30D, SDN controller 8 may insert the pairing of sites 30C and 30D as a tunnel compute request to the front of the queue. As such, SDN controller 8 computes the configuration parameters for the pairing of sites 30C and 30D prior to completing any other configuration data computation for any other pairing of sites 30A-30D to meet the on-demand tunnel need.

Figure 4:
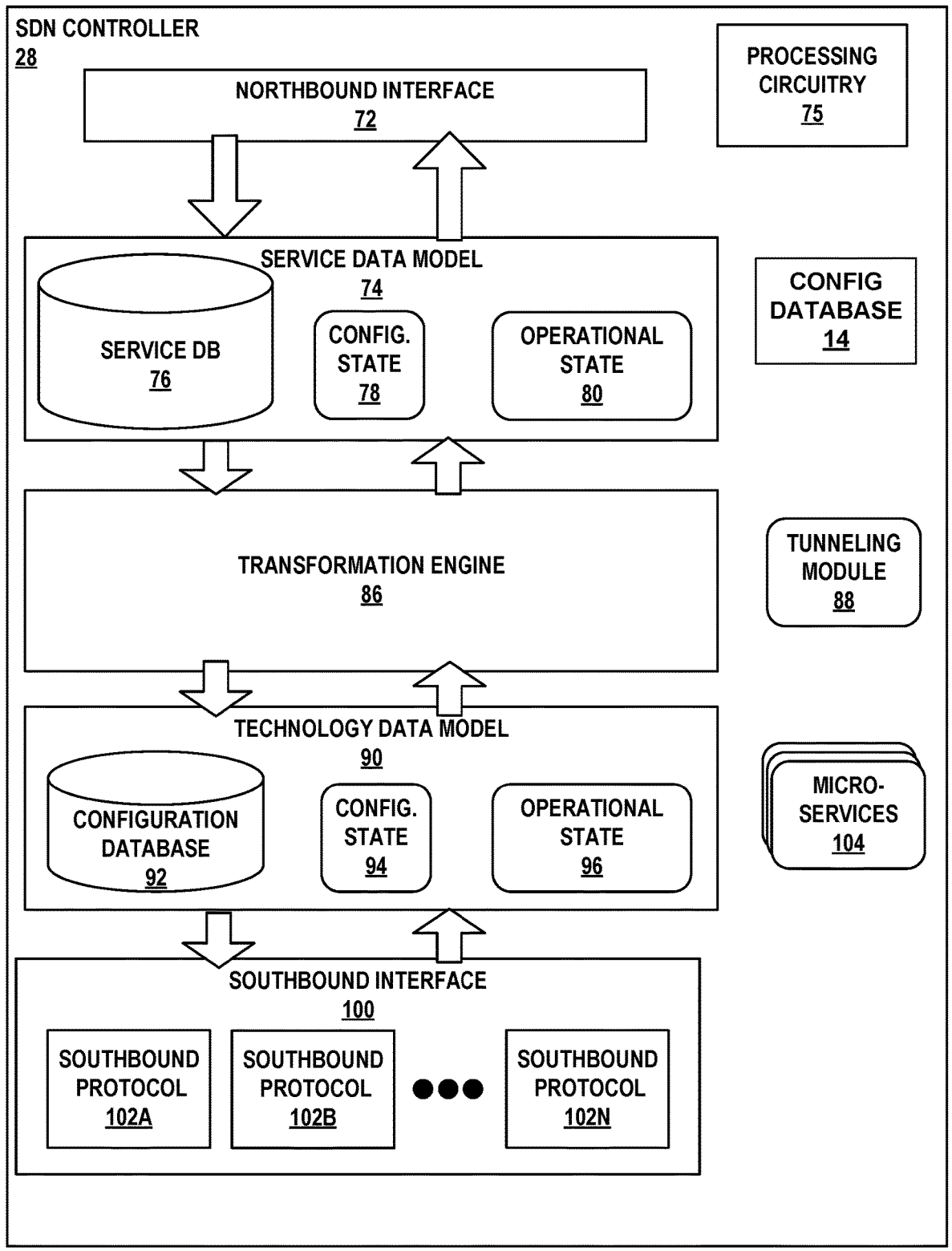
FIG. 4 is a block diagram illustrating an example instance of an SDN controller according to techniques described in this disclosure.

FIG. 4 is a block diagram illustrating an example instance of software-defined networking (SDN) controller 28, in accordance with one or more techniques described in this disclosure. SDN controller 28 is a logically centralized but in some cases physically distributed controller for a network that may be configured to manage configurations of one or more network devices, such as servers, switches, and gateway devices. SDN controller 28 of FIG. 4 may represent an example instance of SDN controller 8 of FIGS. 1-3C.

SDN controller 28 includes processing circuitry 75. Processing circuitry 75 may include one or more processors that are configured to implement functionality and/or process instructions for execution within SDN controller 28. For example, processing circuitry 75 may include, for example, microprocessors, DSPs, ASICs, FPGAs, or equivalent discrete or integrated logic circuitry, or a combination of any of the foregoing devices or circuitry.

Some components of SDN controller 28 are not shown for ease of illustration purposes. These components may include hardware and instructions to execute modules of SDN controller 28. In the example of FIG. 3, SDN controller 28 presents a northbound interface 72 that interfaces with an orchestrator, administrator, or other entity to install configuration state using a high-level service configuration data model, e.g., service data model 74. More specifically, northbound interface 72 that may be invoked to modify configuration state 78 ("config. state 78") or extract operational state 80 of the SDN controller 28 that is descriptive of the service data model 74. Northbound interface 72 may be used for integration with an orchestration system such as OpenStack; northbound interface 72 may also or alternatively be used by other applications or the operator's Operations Support Systems (OSS)/Business Support Systems (BSS). Northbound interface 72 may in some cases present a RESTful Application Programming Interface (API).

Service database 76 stores objects that represent instantiated services within a formal service data model 74. The formal service data model 74 is a high-level service configuration data model used to describe the services that need to be implemented; each high-level service data model has an associated low-level device configuration data model, e.g., technology data model 90, that describes how those services need to be implemented. Each data model comprises of a set of objects, their capabilities, and the relationships between them.

Transformation engine 86 transforms the service objects in service database 76 from the high-level service data model 74 to corresponding lower-level objects in the technology data model 90. Transformation engine 86 may include a schema transformer (not shown in FIG. 3) that converts high-level concepts into low-level objects that can be implemented by the network. For instance, the schema transformer allocates one or more routing-instance objects for a virtual-network. In this sense, transformation engine 86 operates as a compiler to transform the service data model 74 to the technology data model 90. That is, transformation engine 86 may "map" the service data model 74 to the technology data model 90 to describe how the services described in the high-level service data model are to be implemented. Whereas the high-level service data model 74 describes services previously requested and instantiated or being processed for eventual instantiation with the network segment under control of SDN controller 28, the low-level technology data model 90 describes how those services are implemented or are to be implemented within the network, as represented in configuration database 92.

Configuration database 92 may include, for example, one or more objects that describe a tunnel, data center interconnect, or traffic engineered label switched path, that at least partially implements a service in service database 76. The technology data model 90 includes configuration state 94 that describes respective configurations of the network elements (e.g., routing instances and forwarding policy) as well as operational state 96 that describes respective operational characteristics of the network elements, such as load, available bandwidth, etc.

Put another way, the high-level service data model 74 describes the desired state of the network under the control of SDN controller 28 at a very high level of abstraction, using objects that map directly to services provided to end users—for example, a virtual network (e.g., a virtual overlay network), a connectivity policy (e.g., connectivity between workloads and endpoints such as VMs or bare metal servers), a security policy, and SD-WAN on-demand policies. The low-level technology data model 90, on the other hand, describes the desired state of the network at a very low level of abstraction, using objects that map to specific network protocol constructs (e.g., routing instances, routing sessions (e.g., BGP session), routes, overlay tunnels, etc.).

Southbound interface 100 executes one or more southbound protocols 102A-102N (collectively, "southbound protocols 102") with which SDN controller 28 may obtain configuration state 94 and operational state 96 from and inject configuration state 94 and operational state 96 into a network segment under the control of SDN controller 28, where configuration state 94 and operational state 96 store objects intelligible to southbound protocols 102 and mapped to constructs of southbound protocols 102. For example, SDN controller 28 may include an Interface to Metadata Access Points (IF-MAP) server that provides a southbound API to push computed low-level configuration data to a control unit/node (not shown in FIG. 3) that implements a logically centralized portion of the control plane. In this way, SDN controller 28 may make the state of the network under control of SDN controller 28 match the desired state of the network as received by SDN controller 28 via northbound interface 72 and represented by service data model 74.

Southbound protocols 102 may include protocols for path and tunnel provisioning, topology discovery, traffic monitoring, and so forth. For example, southbound protocols 102 may include MP-BGP or IP VPN to listen for routing information exchanged by network devices. Southbound protocols 102 may also include protocols to control network devices in data centers or service provider networks or enterprise networks, such protocols include for instance JSON or JSON-RPC and/or NETCONF/YANG. Southbound protocols 102 may further include other protocols such as Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), Interface to the Routing System (I2RS) protocols, CLIs for the network elements, and SNMP.

In certain SD-WAN technologies, SDN controller 8 may be configured to create dynamic full mesh topologies across the sites. This is called as an "On-Demand Full Mesh Topology," which greatly improves performance of the SD-WAN orchestrator as well as the orchestrated devices while creating full mesh connections across sites at scale. SDN controller 28 may have the intelligence to elastically create and delete full mesh tunnels across sites by monitoring the traffic between the pair of sites. In doing so, SDN controller 28 saves a great amount of time and orchestrator resources when a new site is added. For instance, suppose 100 sites are already managed by the orchestrator and, upon adding a new site, the time and resources used when the newly added site tries to create full mesh with all other existing 100 sites is completely saved. SDN controller 8 monitors the traffic between pairs of sites and, if the traffic reaches above a certain create threshold (e.g., 'x' number of sessions or 'x' bps of throughput), then tunneling module 88 dynamically creates a tunnel between the respective pair of sites by configuring CPEs or other edge devices for the sites with precomputed configuration data. Conversely, if the traffic falls below a certain delete threshold (e.g., 'x' number of sessions or 'x' bps of throughput), then tunneling module 88 dynamically deletes the tunnel between the respective pair of sites by configuring CPEs or other edge devices for the sites.

Tunneling module 88, also known as the tenant site and service management (TSSM) microservice, has the ultimate authority to trigger the creation and deletion of on-demand VPN tunnels between a pair of sites, if the create and delete thresholds respectively are met. Tunneling module 88, in turns, interacts with other microservices 104 before triggering the on-demand full mesh creation. Microservices 104 includes a fault management and performance management (FMPM) microservice, which may receive and process the create and delete dynamic full mesh notifications, as well as monitor the new over the top (OTT) links. Microservices 104 may also include the HAM microservice, which may model and create OTT links. Microservices 104 may also include the intent-based policy and service level agreement management (PSLAM) microservice, which may compute the SD-WAN policy configurations needed over the newly created OTT links, as per the configured SD-WAN policies. Microservices 104 also includes the resource management (RM) microservice, which may activate the VPN routing.

Conventionally, once a create or delete dynamic full mesh notification has been received from the FMPM microservice, tunneling module 108 may, upon interacting with the above mentioned microservices 104, compute the complete configuration which needs to be committed on both the involved sites, and also updates the SDN controller 28 internal states. Once tunneling module 88 computes the configuration, this configuration is pushed onto both of the sites, which will lead to full mesh tunnel creation between the corresponding pair of sites.

The above-described way of handling create and delete on-demand VPN tunnels has multiple drawbacks. In this conventional method, tunneling module 88, after receiving the notification from the FMPM microservice, reactively computes the full mesh configuration which needs to be pushed into the device, even though the configuration for dynamic full mesh creation between the pair of sites is going to remain constant, whether computed reactively or proactively. Every time the on-demand full mesh is deleted and then created again, then the configuration is re-computed again, which adds to the computation power for all of microservices 104, and also it adds on to the time taken to create and delete on-demand full mesh topology. When tunneling module 88 is overloaded with a large number of on-demand full mesh creation/deletion requests, tunneling module 88 may have to implement rate limiting on the number of on-demand full mesh creation and deletions. Tunneling module 88 may also implement delayed queues to handle on-demand full mesh creation and deletion requests, in order to make sure that all of the creation and deletion requests are honored.

To overcome these deficiencies and in accordance with techniques of this disclosure, tunneling module 88 proactively computes the configuration needed for the creation of on-demand tunnels between a pair of full mesh capable sites. Tunneling module 88 implements a separate queue for this purpose. Whenever a full mesh capable site gets added to an SD-WAN environment, tunneling module 88 adds a job in the full mesh config computation queue. In this job, tunneling module 88 does the work of computing a full mesh configuration between the current site and all other full mesh capable sites which are already being managed by the SDN controller 28.

This computed configuration is saved into configuration database 9 on a per site pair basis. When an on-demand full mesh creation request is received by tunneling module 88 for a particular site, tunneling module 88 checks configuration database 9 for the configuration. If the configuration is found, then this configuration is pushed into the devices leading to the creation of full mesh between corresponding pair of sites. If the configuration is not found, then tunneling module 88 computes the required configuration and then pushes the configuration onto the devices leading to the creation of full mesh between corresponding pair of sites. In case of site edit work flows, which will lead to changes in the full mesh configuration, then tunneling module 88 adds a new job into the full mesh config computation queue, which will re-compute the full mesh configurations needed between the pair of sites.

The FMPM microservice of microservices 104 monitors whether the on demand full mesh creation and deletion thresholds are met and sends real time requests to tunneling module 88. The config computation queue is a low priority queue and the real time requests from the FMPM microservice are given more priority when compared to the jobs in the config computation queue. This will help in effective utilization of idle time of SDN controller 28 resources.

In accordance with the techniques described herein, tunneling module 88 may precompute configuration data for an overlay tunnel through a wide area network to connect a first site and a second site of a plurality of sites in the SD-WAN environment. In some instances, the first site and the second site may be a first and second node device, meaning that the overlay tunnel is an overlay tunnel between the first node device and the second node device. Tunneling module 88 may use any protocol suitable for calculating configuration data for overlay tunnels, including the IKE protocol.

Any number of events may trigger this precomputation action. For instance, tunneling module 88 may detect that the first site is a full mesh capable site. In response to determining that the first site is full mesh capable, tunneling module 88 may precompute the configuration data for at least the first site and the second site. Tunneling module 88 may also precompute the configuration data between the first site and every other full mesh capable site in the wide area network.

In other instances, tunneling module 88 may detect an addition of the first site to the plurality of sites of the SD-WAN, meaning that the first site is a new site in the wide area network. In response to detecting the addition of the first site, tunneling module 88 may proceed to precompute the configuration data.

In precomputing the configuration data, tunneling module 88 may add an entry to a configuration computation queue, the entry including an indication of the overlay tunnel between the first site and the second site. When precomputing the configuration data, tunneling module 88 may proceed through the queue, precomputing configuration data for each respective entry in the configuration computation queue, resulting in configuration database 9 including configuration data for overlay tunnels between any number of networks.

Tunneling module 88 may obtain, after precomputing the configuration data, an indication to configure the overlay tunnel. This may include tunneling module 88 utilizing microservices 114 to monitor traffic between the first site and the second site. Based on this monitoring, tunneling module 88 may detect that one or more tunneling policies have been met by the traffic between the first site and the second site. The tunneling policies could include at least one of a type of the traffic, a throughput threshold for the traffic, and a threshold number of sessions for the traffic. In response to detecting that the one or more tunneling policies have been met, tunneling module 88 may retrieve the configuration data for the overlay tunnel.

Tunneling module 88 may further detect that the one or more tunneling polices are no longer met by the traffic between the first site and the second site, meaning the overlay tunnel is no longer necessary. As such, tunneling module 88 may remove the overlay tunnel between the first site and the second site. However, for future use, tunneling module 88 still stores the configuration data for the overlay tunnel between the first site and the second site in configuration database 9.

The obtained indication to configure the overlay tunnel may take a variety of forms. For instance, tunneling module 88 may obtain the indication to configure the overlay tunnel by obtaining a request for a full mesh configuration for the first site. In other instances, tunneling module 88 may obtain the indication to configure the overlay tunnel by obtaining a request for implementation of the overlay tunnel between the first site and the second site.

The techniques described herein may be implemented, in some examples, for hub and spoke networks. For instance, the first site may be a first spoke site, and the second site may be a second spoke site. In such instances, in obtaining the indication to configure the overlay tunnel, tunneling module 88 may utilize microservices 114 to monitor traffic between the first spoke site and the second spoke site at a hub site connecting the first spoke site to the second spoke site. Tunneling module 88 may detect that one or more tunneling policies have been met by the traffic at the hub site and between the first spoke site and the second spoke site. In response to detecting that the one or more tunneling policies have been met, tunneling module 88 may retrieve the configuration data for the overlay tunnel.

Tunneling module 88 may send, in response to receiving the indication to configure the overlay tunnel, at least some of the configuration data to the first site to configure the first site with the overlay tunnel. Tunneling module 88 may also store the configuration data for the overlay tunnel between the first site and the second site in configuration database 9.

In some examples, tunneling module 88 may further precompute configuration data for a second overlay tunnel through the wide area network to connect the first site and a third site of the plurality of sites in the SD-WAN environment. Tunneling module 88 may obtain, after precomputing the configuration data for the second overlay tunnel, an indication to configure the second overlay tunnel. Tunneling module 88 may then send, in response to receiving the indication to configure the second overlay tunnel, at least some of the configuration data for the second overlay tunnel to the first site to configure the first site with the second overlay tunnel. In this way, tunneling module 88 may precompute the configuration data for each pair of sites across the SD-WAN environment.

While tunneling module 88 aims to precompute the configuration data for each overlay tunnel that could be instituted in the network. In some examples, tunneling module 88 may detect that one or more tunneling policies have been met for traffic between the first site and a third site of the plurality of sites, but may also determine that configuration data for a second overlay tunnel is not present in the configuration database, the second overlay tunnel being for the traffic between the first site and the third site. In response to determining that the configuration data for the second overlay tunnel is not present in the configuration database, tunneling module 88 may then compute the configuration data for the second overlay tunnel and send at least some of the configuration data for the second overlay tunnel to the first site to configure the first site with the second overlay tunnel. In computing the configuration data for the second overlay tunnel, tunneling module 88 may add an indication of the second overlay tunnel to a high-priority queue. In other instances, tunneling module 88 may add an indication of the second overlay tunnel to a front of a low-priority configuration computation queue.

Tunneling module 88 may also account for site edit workflows that alter characteristics of the sites. For instance, tunneling module 88 may utilize microservices 114 to detect a site edit workflow altering one or more characteristics of the first site. In response to detecting the site edit workflow, tunneling module 88 may precompute updated configuration data for an overlay tunnel through the wide area network to connect the first site and the second site and replace the configuration data in configuration database 9 with the updated configuration data.

In general, the techniques described herein include the proactive configuration calculation for on-demand full mesh topologies instead of reactively computing the configuration parameters. The time taken for on-demand full mesh creation between a pair of sites will be hugely reduced, as the reactive calculation takes upwards of three minutes. Further, the number of on-demand full mesh creation and deletion jobs which tunneling module 88 can handle will increase significantly. When the on-demand full mesh tunnel is deleted and then created again, the load on other microservices 104 during re-computation of the whole configuration and updating internal SDN controller states are hugely reduced. Ultimately, the techniques described herein provide an effective utilization of the idle time for SDN controller 28 resources.

Figure 5:
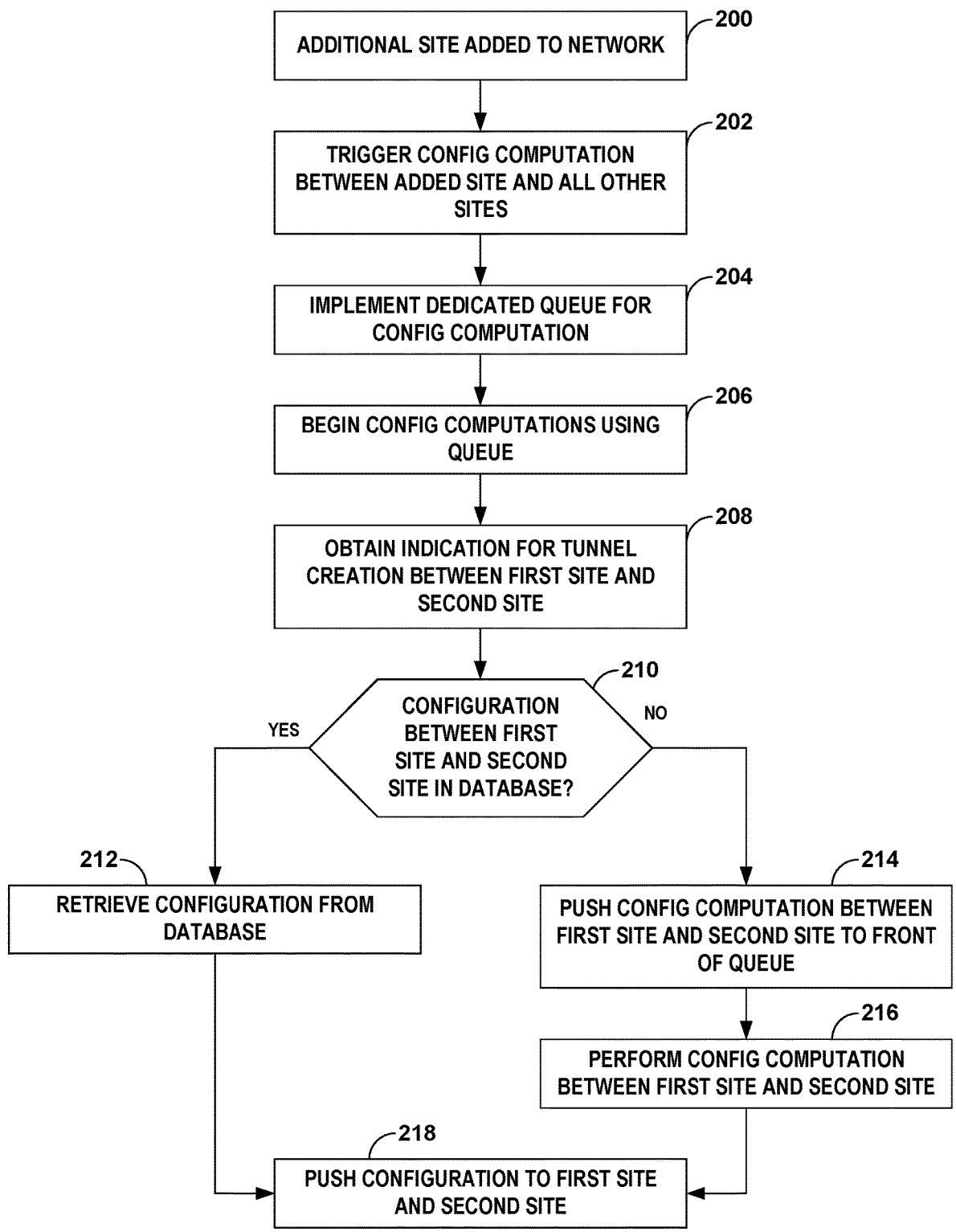
FIG. 5 is a flowchart illustrating an example method of operation in accordance with one or more example techniques described in this disclosure.

FIG. 5 is a flowchart illustrating an example method of operation in accordance with one or more example techniques described in this disclosure. For instance, the examples illustrated in FIG. 5 are for communicating in an SD-WAN, such as an SD-WAN arranged in a hub-and-spoke topology or a full mesh topology.

In accordance with the techniques described herein, a new site may be added to a set of SD-WAN sites in an SD-WAN environment (200). The addition of the new site triggers, for SDN controller 8, a tunnel configuration computation between the new site and each existing site previously in the network, so long as the new site and the existing sites are full mesh capable (202). For this computation, SDN controller 8 implements a dedicated queue for the configuration computation by adding each pair of the new site and an existing site to the queue (204). SDN controller 8 begins to perform the configuration computations using this queue (206), saving the completed tunnel configurations to a configuration database and moving to the next pair in the queue. SDN controller 8 may configure multiple tunnel configurations for each pair of sites for redundancy.

Subsequently to computing a tunnel configuration for a tunnel between a first site and a second site of the sites, SDN controller 8 obtains an indication to configure the tunnel between the first site and the second site in the network (208). SDN controller 8 checks the configuration database to see if configuration data is already computed and stored for a tunnel between the first site and the second site (210). If this configuration data is saved to the configuration database (YES branch of 210), SDN controller retrieves the configuration parameters from the configuration database (212). If the configuration parameters are not saved to the configuration database (NO branch of 210), SDN controller 8 pushes the configuration computation between the first site and the second site to the front of the queue (214). SDN controller 8 then performs the configuration data computation for a tunnel between the first site and the second site to generate the configuration data (216). SDN controller 8 may store this new configuration data for the tunnel between the first site and the second site to configuration database 9. In either case proceeding from step 212 or 216, once SDN controller 8 has the configuration data, SDN controller 8 pushes at least some of the configuration data to the first site and at least some of the configuration data the second site to configure the tunnel.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), Flash memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry or processing circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A controller comprising processing circuitry and a storage device, wherein the processing circuitry has access to the storage device and is configured to:
when a first software-defined wide area network (SD-WAN) site is not configured with a direct SD-WAN tunnel between the first SD-WAN site and a second SD-WAN site and based on a determination that a tunneling policy has been met by network traffic between the first SD-WAN site and the second SD-WAN site, determine whether configuration data to push to the first SD-WAN site to configure the first SD-WAN site to create an SD-WAN tunnel between the first SD-WAN site and the second SD-WAN site is stored; and
based on a determination that the configuration data to push to the first SD-WAN site to configure the first SD-WAN site to create the SD-WAN tunnel is stored, push the configuration data to the first SD-WAN site to configure the first SD-WAN site to create the SD-WAN tunnel between the first SD-WAN site and the second SD-WAN site.

2. The controller of claim 1, wherein to determine that the tunneling policy has been met by the network traffic between the first SD-WAN site and the second SD-WAN site, the processing circuitry is configured to:
obtain flow monitoring data indicating the network traffic between the first SD-WAN site and the second SD-WAN site.

3. The controller of claim 1, wherein to determine that the tunneling policy has been met by the network traffic between the first SD-WAN site and the second SD-WAN site, the processing circuitry is configured to:
determine a type of the network traffic between the first SD-WAN site and the second SD-WAN site matches a type specified in the tunneling policy;
determine an amount of the network traffic between the first SD-WAN site and the second SD-WAN site meets a threshold amount specified in the tunneling policy; or
determine a number of sessions of the network traffic between the first SD-WAN site and the second SD-WAN site meets a threshold number of sessions specified in the tunneling policy.

4. The controller of claim 1, wherein the processing circuitry is further configured to:
determine that the tunneling policy is no longer met by the network traffic between the first SD-WAN site and the second SD-WAN site; and
configure the first SD-WAN site to delete the SD-WAN tunnel between the first SD-WAN site and the second SD-WAN site.

5. The controller of claim 1, wherein the processing circuitry is further configured to:
based on a determination that the configuration data to push to the first SD-WAN site to configure the first SD-WAN site to create the SD-WAN tunnel is not stored, compute configuration data to push to the first SD-WAN site to configure the first SD-WAN site to create the SD-WAN tunnel and push the computed configuration data to the first SD-WAN site to configure the first SD-WAN site to create the SD-WAN tunnel between the first SD-WAN site and the second SD-WAN site.

6. The controller of claim 1,
wherein the first SD-WAN site comprises a first spoke site,
wherein the second SD-WAN site comprises a second spoke site, and
wherein to determine that the tunneling policy has been met by the network traffic between the first SD-WAN site and the second SD-WAN site, the processing circuitry is configured to:
obtain flow monitoring data indicating network traffic between the first spoke site and the second spoke site, the network traffic received at a hub site connecting the first spoke site to the second spoke site; and
determine, based on the flow monitoring data, the tunneling policy has been met by the network traffic at the hub site.

7. The controller of claim 1, wherein the processing circuitry is further configured to, prior to a determination that the tunneling policy has been met by the network traffic between the first SD-WAN site and the second SD-WAN site:
precompute the configuration data to push to the first SD-WAN site to configure the first SD-WAN site to create the SD-WAN tunnel; and
store the configuration data to push to the first SD-WAN site to configure the first SD-WAN site to create the SD-WAN tunnel to a storage device.

8. The controller of claim 1,
wherein the first SD-WAN site comprises a first edge device,
wherein the second SD-WAN site comprises a second edge device, and
wherein the SD-WAN tunnel comprises an SD-WAN tunnel between the first edge device and the second edge device.

9. The controller of claim 8, wherein the first edge device comprises one or more of a gateway, edge router, or security device.

10. The controller of claim 1, wherein the processing circuitry is further configured to:
detect the first SD-WAN site has been added to a plurality of sites of an SD-WAN that includes the second SD-WAN site; and
in response to detecting the addition of the first SD-WAN site, precompute the configuration data to push to the first SD-WAN site to configure the first SD-WAN site to create the SD-WAN tunnel and store the configuration data to push to the first SD-WAN site to configure the first SD-WAN site to create the SD-WAN tunnel to a storage device.

11. The controller of claim 1, wherein the processing circuitry is further configured to:
detect a site edit workflow altering one or more characteristics of the first SD-WAN site; and
in response to detection of the site edit workflow:
precompute the configuration data to push to the first SD-WAN site to configure the first SD-WAN site to create the SD-WAN tunnel between the first SD-WAN site and the second SD-WAN site; and
replace prior configuration data in a storage device with the configuration data.

12. A method comprising:
when a first software-defined wide area network (SD-WAN) site is not configured with a direct SD-WAN tunnel between the first SD-WAN site and a second SD-WAN site and based on determining that a tunneling policy has been met by network traffic between the first SD-WAN site and the second SD-WAN site, determining, by processing circuitry, whether configuration data to push to the first SD-WAN site to configure the first SD-WAN site to create an SD-WAN tunnel between the first SD-WAN site and the second SD-WAN site is stored; and based on determining the configuration data to push to the first SD-WAN site to configure the first SD-WAN site to create the SD-WAN tunnel is stored, pushing, by the processing circuitry, the configuration data to the first SD-WAN site to configure the first SD-WAN site to create the SD-WAN tunnel between the first SD-WAN site and the second SD-WAN site.

13. The method of claim 12, wherein determining that the tunneling policy has been met by network traffic between the first SD-WAN site and the second SD-WAN site comprises:
obtaining flow monitoring data indicating the network traffic between the first SD-WAN site and the second SD-WAN site.

14. The method of claim 12, wherein determining that the tunneling policy has been met by the network traffic between the first SD-WAN site and the second SD-WAN site comprises:
determining a type of the network traffic between the first SD-WAN site and the second SD-WAN site matches a type specified in the tunneling policy;
determining that an amount of the network traffic between the first SD-WAN site and the second SD-WAN site meets a threshold amount specified in the tunneling policy; or
determining that a number of sessions of the network traffic between the first SD-WAN site and the second SD-WAN site meets a threshold number of sessions specified in the tunneling policy.

15. The method of claim 12, comprising:
based on determining that the configuration data for the SD-WAN tunnel is not stored, computing configuration data to push to the first SD-WAN site to configure the first SD-WAN site to create the SD-WAN tunnel and pushing the computed configuration data to the first SD-WAN site to configure the first SD-WAN site to create the SD-WAN tunnel between the first SD-WAN site and the second SD-WAN site.

16. The method of claim 12,
wherein the first SD-WAN site comprises a first spoke site, wherein the SD-WAN second site comprises a second spoke site, and
wherein determining that the tunneling policy has been met by the network traffic between the first SD-WAN site and the second SD-WAN site comprises:

obtaining flow monitoring data indicating network traffic between the first spoke site and the second spoke site, the network traffic received at a hub site connecting the first spoke site to the second spoke site; and
determining, based on the flow monitoring data, that the tunneling policy has been met by the network traffic at the hub site.

17. The method of claim 12, comprising, prior to determining that the tunneling policy has been met by the network traffic between the first SD-WAN site and the second SD-WAN site:
precomputing the configuration data to push to the first SD-WAN site to configure the first SD-WAN site to create the SD-WAN tunnel; and
storing the configuration data to push to the first SD-WAN site to configure the first SD-WAN site to create the SD-WAN tunnel to a storage device.

18. The method of claim 12, wherein the first SD-WAN site comprises a first edge device, wherein the second SD-WAN site comprises a second edge device, and wherein the SD-WAN tunnel comprises an SD-WAN tunnel between the first edge device and the second edge device.

19. The method of claim 12, further comprising:
detecting the first SD-WAN site has been added to a plurality of sites of an SD-WAN that includes the second SD-WAN site; and
in response to detecting the addition of the first SD-WAN site, precomputing the configuration data to push to the first SD-WAN site to configure the first SD-WAN site to create the SD-WAN tunnel and storing the configuration data for creating the SD-WAN tunnel to a storage device.

20. A non-transitory computer-readable storage medium comprising instructions that, when executed, cause one or more programmable processors to:
when a first software-defined wide area network (SD-WAN) site is not configured with a direct SD-WAN tunnel between the first SD-WAN site and a second SD-WAN site and based on determining that a tunneling policy has been met by network traffic between the first SD-WAN site and the second SD-WAN site, determine whether configuration data to push to the first SD-WAN site to configure the first SD-WAN site to create an SD-WAN tunnel between the first SD-WAN site and the second SD-WAN site is stored; and
based on determining that the configuration data to push to the first SD-WAN site to configure the first SD-WAN site to create the SD-WAN tunnel is stored, push the configuration data to the first SD-WAN site to configure the first SD-WAN site to create the SD-WAN tunnel between the first SD-WAN site and the second SD-WAN site.

* * * * *